United States Patent [19]
Sawada

[11] Patent Number: 6,007,163
[45] Date of Patent: Dec. 28, 1999

[54] BRAKE CONTROL APPARATUS FOR A VEHICLE

[75] Inventor: Mamoru Sawada, Yokkaichi, Japan

[73] Assignee: Denso Corporation, Kariya, Japan

[21] Appl. No.: 08/966,804

[22] Filed: Nov. 10, 1997

[30] Foreign Application Priority Data

Nov. 11, 1996 [JP] Japan ..................................... 8-298867

[51] Int. Cl.⁶ .................................. B60T 8/88; B60T 8/40
[52] U.S. Cl. ................................ 303/122.09; 303/122.12; 303/116.2
[58] Field of Search ..................... 303/122.09, 122.12, 303/122.13, 122.14, DIG. 3, DIG. 4, 11, 116.1, 116.2; 417/63

[56] References Cited

U.S. PATENT DOCUMENTS

| | | | |
|---|---|---|---|
| 3,650,571 | 3/1972 | Chouings | 303/10 |
| 3,827,761 | 8/1974 | Inada | 303/21 |
| 4,790,607 | 12/1988 | Atkins . | |
| 4,824,183 | 4/1989 | Uchida et al. | 303/92 |
| 5,070,459 | 12/1991 | Van Zanten et al. . | |
| 5,152,585 | 10/1992 | Patient et al. | 303/10 |
| 5,207,485 | 5/1993 | Troster . | |
| 5,236,252 | 8/1993 | Phipps | 303/11 |
| 5,236,256 | 8/1993 | Schmidt et al. . | |
| 5,237,310 | 8/1993 | Smith | 340/679 |
| 5,333,706 | 8/1994 | Mori | 188/156 |
| 5,411,326 | 5/1995 | Linhoff | 303/116.2 |
| 5,568,962 | 10/1996 | Enomoto et al. | 303/3 |

FOREIGN PATENT DOCUMENTS

| | | |
|---|---|---|
| 3435089 | 4/1986 | Germany . |
| 4029793 | 3/1992 | Germany . |
| 2 297 134 | 7/1996 | United Kingdom . |
| 96/10506 | 4/1996 | WIPO . |

Primary Examiner—Robert J. Oberleitner
Assistant Examiner—Jeffrey Woller
Attorney, Agent, or Firm—Pillsbury Madison & Sutro LLP

[57] ABSTRACT

A pressure difference is formed between a master cylinder pressure and a wheel cylinder pressure when a master cut-off valve closes a hydraulic path connecting a master cylinder and a wheel cylinder and a hydraulic pump supplies pressurized brake fluid to the wheel cylinder. After the pressure difference has been formed, the master cut-off valve opens the hydraulic path so that the pressure difference is cancelled. As a result, pulsations in brake fluid pressure occurs in the hydraulic path. A failure of the master cut-off valve or the hydraulic pump is detected based on the pulsations in brake fluid pressure.

26 Claims, 12 Drawing Sheets

BRAKE CONTROL APPARATUS FOR A VEHICLE

CROSS REFERENCE TO RELATED APPLICATION

The present invention is based upon and claims the benefit of priority of the prior Japanese Patent Application No. H. 8-298867 filed on Nov. 11, 1996, the contents of which are incorporated by reference.

BACKGROUND OF THE INVENTION

1. Field of the Invention

The present invention relates to a vehicular brake apparatus which brakes a vehicle with wheel braking force generated by, for example, a control valve or a pump.

2. Related Arts

Conventionally, traction control (TRC) to decrease acceleration slip of a wheel or the like is well known as braking control performed when a driver does not depress a brake pedal, that is, during a no braking-operation of the driver. When this kind of braking control is executed, brake fluid pressure is provided to a wheel cylinder by a brake fluid circuit. For example, the brake fluid circuit has a master-cylinder cut-off (SMC) valve which can cut off the connection between the master cylinder and the wheel cylinder. The brake fluid circuit provides brake fluid pressure to the wheel cylinder by supplying pressurized brake fluid between the SMC valve and the wheel cylinder. That is to say, the SMC valve separates the wheel cylinder from the master cylinder. In this state, a pump generates the pressurized brake fluid which is supplied to the wheel cylinder. As a result, the brake fluid pressure in the wheel cylinder increases and a differential pressure is established between the two sides of the SMC valve.

In the system for performing traction control (or a system for performing anti-skid brake control (ABS)), a primary check therefor is normally executed. In this primary check, conductive states to each of valves or the pump are examined. In other words, the system checks whether cutoffs or short-circuits in electrical systems for each of the valves or the pump have occurred.

However, the system has no function for checking whether the differential pressure can be actually established between the two sides of the SMC valve or whether the pump can actually generate the pressurized brake fluid. Therefore, it is uncertain if the SMC valve and the pump work in the right way and the necessary brake fluid pressure can be supplied to the wheel cylinder. If the SMC valve or the pump functions insufficiently, an obstacle to braking control performed by the system may occur.

SUMMARY OF THE INVENTION

In view of the above-described problems, the object of the present invention is to provide a vehicular brake apparatus which can easily and reliably detect the operating state of an actuator such as an SMC valve or a pump.

To achieve this object, in the brake apparatus for a vehicle according to the present invention, brake fluid pressure generated by a brake fluid pressure generating device is transmitted to a wheel braking force generating device via a hydraulic path connecting therebetween. When a pressure difference generating device disposed in the hydraulic path is activated, for example during traction control, a pressure difference is generated between brake fluid pressure on a side of the brake fluid pressure generating device and brake fluid pressure on a side of the wheel braking force generating device, for example, in order that sufficient brake fluid pressure is applied to the wheel braking force generating device. After the pressure difference has been formed, the pressure difference generating device is controlled so that the pressure difference is cancelled. As a result, pulsations in brake fluid pressure occur in the hydraulic path. A determining device can determine a failure of the pressure difference generating device based on the pulsations in brake fluid pressure.

If a pressure difference of a predetermined magnitude has occurred, when the pressure difference generating device is controlled to cancel it, it is considered that brake fluid pressure pulsations of a predetermined variation width are caused thereby. Therefore, an operating state of the pressure difference generating device can be detected based on the brake fluid pressure pulsations.

BRIEF DESCRIPTION OF THE DRAWINGS

This and other objects, features and characteristics of the present invention will be appreciated from a study of the following detailed description, the appended claims, and drawings, all of which form a part of this application. In the drawings:

DETAILED DESCRIPTION OF THE PREFERRED EMBODIMENTS

Preferred embodiments according to the present invention will be described hereinafter with reference to the drawings.

(FIRST EMBODIMENT)

In the first embodiment, brake fluid pressure pulsations which occur when a control valve is temporarily turned off while the control valve and a pump in a hydraulic circuit are driven are detected. The embodiment determines whether a differential pressure generating function of the control valve and a brake fluid discharging function of the pump are normal in response to the brake fluid pressure pulsations.

Figure 1:
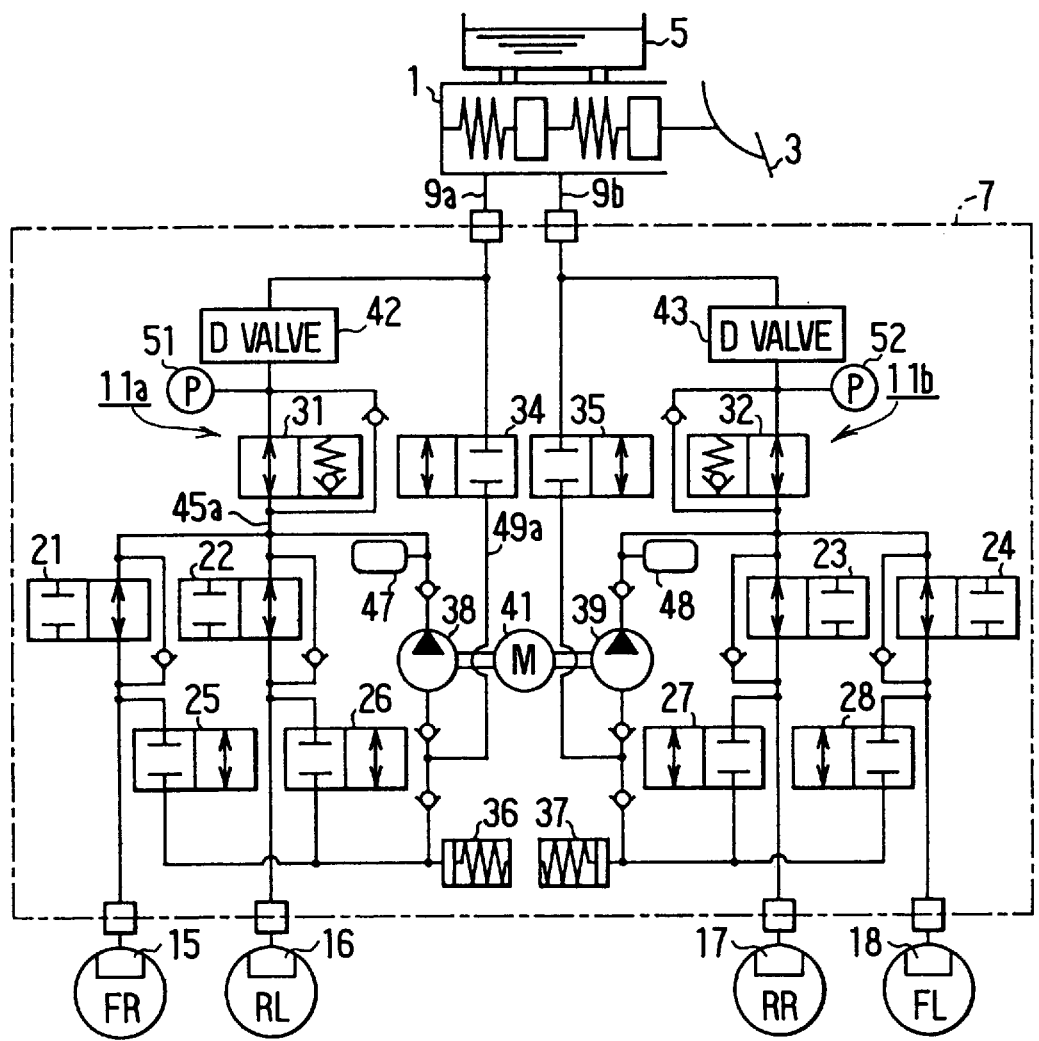
FIG. 1 is a model diagram illustrating a structure of a vehicular brake apparatus according to a first embodiment of the present invention.

FIG. 1 is a model diagram illustrating a vehicular brake apparatus which performs well-known traction control (TRC control), anti-skid brake control (ABS control), and power brake control (PB control) which can increase braking force to a level higher than normal. As shown in FIG. 1, the vehicular brake apparatus has a tandem type master cylinder. A brake pedal 3, master reservoir 5, and a hydraulic pressure control circuit 7 having a diagonal type two hydraulic conduit system for controlling brake fluid pressure of wheel cylinders are connected to this master cylinder 1. In detail, the master cylinder 1 is connected to a first hydraulic conduit 11a and a second hydraulic conduit 11b, both of which collectively constitute the hydraulic pressure control circuit 7, through a fluid path 9a and a fluid path 9b, respectively.

In the hydraulic control circuit 7, a wheel cylinder 15 of a front-right (FR) wheel and a wheel cylinder 16 of a rear-left (RL) wheel are communicated through the first hydraulic conduit 11a. Also, a wheel cylinder 17 of a rear-right (RR) wheel and a wheel cylinder 18 of a front-left (FL) wheel are communicated through the second hydraulic conduit 11b.

A pressure-increasing control valve 21 and a pressure-reducing control valve 25 for controlling hydraulic pressure of the wheel cylinder 15 of the FR wheel and a pressure-increasing control valve 22 and a pressure-reducing control valve 26 for controlling hydraulic pressure of the wheel cylinder 16 of the RL wheel are disposed in the first hydraulic conduit 11a. Similarly, a pressure-increasing control valve 23 and a pressure-reducing control valve 27 for controlling hydraulic pressure of the wheel cylinder 17 of the RR wheel and a pressure-increasing control valve 24 and a pressure-reducing control valve 28 for controlling hydraulic pressure of the wheel cylinder 18 of the FL wheel are disposed in the second hydraulic conduit 11b.

The structure of the first hydraulic conduit 11a will be described hereinafter. A master-cylinder cutoff valve (SMC valve) 31 to cause a hydraulic path 45a to be communicated or interrupted and a D-valve 42 to increase hydraulic pressure of the wheel cylinders 15 and 16 are provided in the first hydraulic conduit 11a between the master cylinder 1 and the respective pressure-increasing control valves 21 and 22. It is to be noted that when the brake fluid pressure on a side of the wheel cylinders 15 and 16 excessively rises, the SMC valve 31 opens the hydraulic path 45a.

The D-valve 42 is to be used for the above-described PB control, and is a proportioning control valve connected in a reverse direction. The proportioning control valve is generally used to make an increasing pressure gradient for a rear wheel cylinder gentler than that for a front wheel cylinder when master cylinder pressure exceeds a predetermined value corresponding to a split point of the proportioning control valve. Therefore, due to this reverse-connected proportioning control valve, brake fluid pressure on a side of the hydraulic path 45a can be made higher by a predetermined ratio determined by the proportioning control valve than the master cylinder pressure when the hydraulic pump 38 is driven in a state when the SMC valve 31 is opened.

Additionally, a reservoir 36 to temporarily accumulate brake fluid discharged from the respective pressure-reducing control valves 25 and 26 and the hydraulic pump 38 for force-feeding brake fluid to the hydraulic path 45a are provided in the first hydraulic conduit 11a. An accumulator 47 to suppress transmission of pulsation in hydraulic pressure to the wheel cylinders 15 and 16 is disposed in a discharge path of brake fluid from the hydraulic pump 38. Furthermore, a hydraulic path 49a to supply brake fluid from the master cylinder 1 directly to the hydraulic pump 38 to increase wheel-cylinder pressure during execution of traction control or the like is provided in the first hydraulic conduit 11a. Further, a reservoir cutoff valve (SRC valve) 34 to cause the hydraulic path 49a to be communicated or interrupted is disposed in the hydraulic path 49a.

In the first embodiment, a pressure sensor 51 for detecting brake fluid pressure is provided between the D-valve 42 and the SMC valve 31. Brake fluid pressure detected by the pressure sensor 51 is used to check whether a differential pressure generating function of the SMC valve 31 and a brake fluid discharging function of the hydraulic pump 38 are normal. When a pressure differential occurs between the two sides of the SMC valve 31 due to the operation of the hydraulic pump 38 put in motion, lower brake fluid pressure is applied on one side of the SMC valve 31 to which the pressure sensor 51 is connected. Therefore, the pressure sensor 51 detects pulsation of brake fluid on a side of the lower brake fluid pressure which is larger in amplitude than that on a side of higher brake fluid pressure.

Meanwhile, similarly to the foregoing first hydraulic conduit 11a, the pressure-increasing control valves 23 and 24, the pressure-reducing control valves 27 and 28, an SMC valve 32, a D-valve 43, a pressure sensor 52, a reservoir 37, a hydraulic pump 39, an accumulator 48, an SRC valve 35, and so on are disposed at similar locations in the second hydraulic conduit 11b. It is to be noted that the hydraulic pumps 38 and 39 are interlinked to an electrical pump motor 41 and driven thereby.

Figure 2:
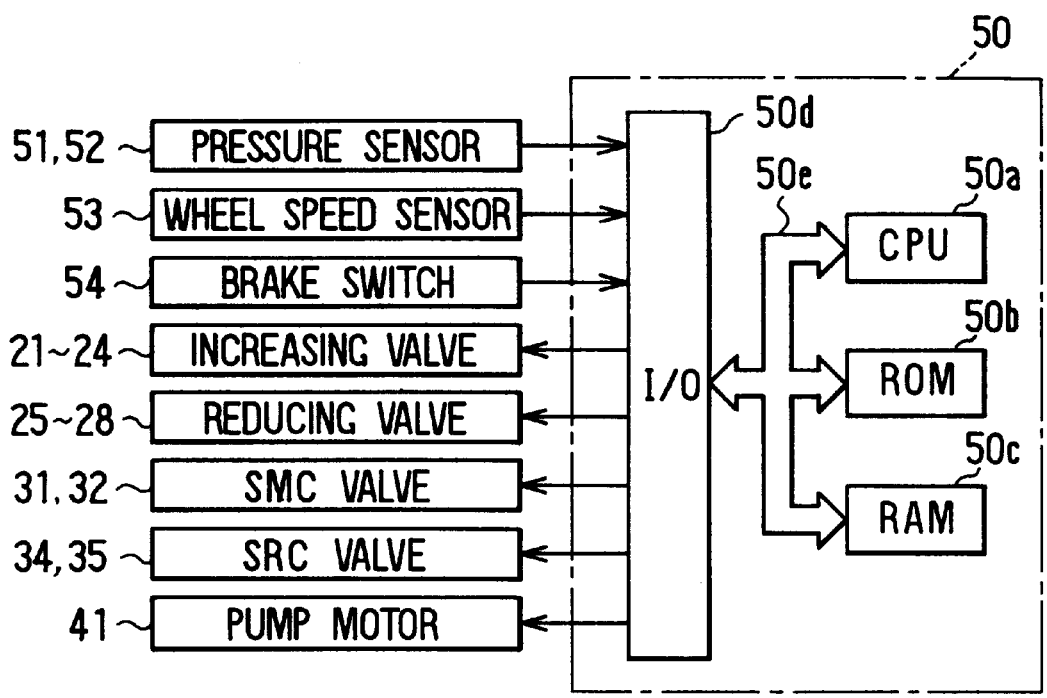
FIG. 2 is a block diagram illustrating an electrical control unit of the first embodiment.

As shown in FIG. 2, an ECU 50 to control the vehicular brake apparatus as described above is made up primarily of a microprocessor provided with a CPU 50a, a ROM 50b, a RAM 50c, an input/output portion 50d, a bus line 50e, and the like of known art. Signals from wheel-speed sensors 53 disposed at the wheels, a brake switch 54, pressure sensors 51 and 52, and so on are fed to the ECU 50. In addition, control signals from the ECU 50 are provided to control actuators such as the pressure-increasing control valves 21 to 24, the pressure-reducing control valves 25 to 28, the SMC valves 31 and 32, the SRC valves 34 and 35, and the electrical pump motor 41.

Figure 3:
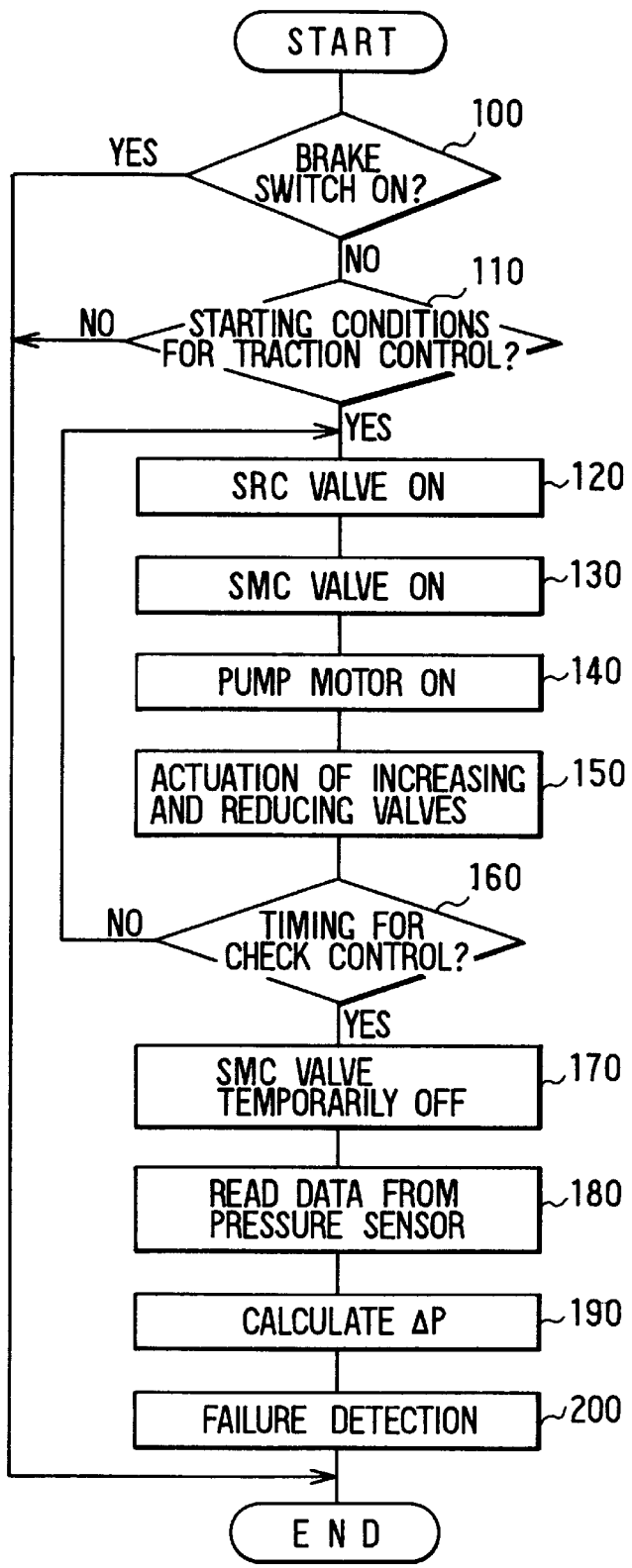
FIG. 3 is a flowchart illustrating control processing in the first embodiment.
Figure 4:
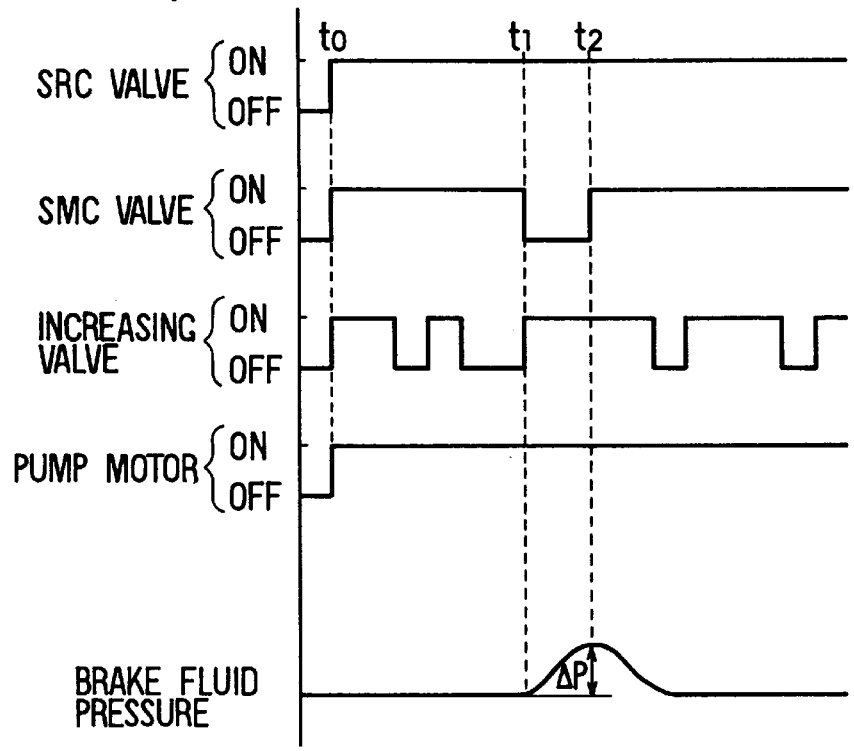
FIG. 4 is a timing chart illustrating states of each of valves and brake fluid pressure in the first embodiment of the present invention.

Control processing according to this embodiment will be described next with reference to the flowchart in FIG. 3 and the timing chart in FIG. 4. The flowchart shown in FIG. 3 is, for example, repeatedly executed every predetermined time period. Further, the control processing includes control processing (hereinafter termed as 'check control') for checking the differential pressure generating function of the SMC valve 31 and the brake fluid discharging function of the hydraulic pump 38. Check control for the first hydraulic conduit 11a is executed separately from check control for the second hydraulic conduit 11b. However, because check control for the first hydraulic conduit 11a and the second hydraulic conduit 11b is the same, check control for the first hydraulic conduit 11a is exemplified in FIGS. 3 and 4.

Step 100 in FIG. 3 determines whether the brake pedal 3 has been depressed by determining whether the brake switch 54 is on. When an affirmative determination is made herein, because braking control during a no braking-operation is not necessary, this routine is terminated; when a negative determination is made, the processing advances to step S110.

Step 110 determines whether, for example, requirements for starting traction control are fulfilled by determining whether an acceleration slip ratio of a vehicle wheel exceeds a predetermined value. When an affirmative determination is made herein, the processing advances to step 120; when a negative determination is made, this routine is terminated.

The master cylinder 1 and an intake side of the hydraulic pump 38 are communicated by opening the SRC valve 34 in the first hydraulic conduit 11*a* in step 120, to start traction control. The hydraulic path is closed in subsequent step 130 by driving the SMC valve 31 to a closed state. The electrical pump motor 41 is turned on in step 140 to put the hydraulic pump 38 in motion while the SRC valve 34 is in an open state and the SMC valve 31 is in the closed state. As a result, pressurized brake fluid is supplied to the hydraulic path 45*a* between the SMC valve 31 and the pressure-increasing control valves 21 and 22. Due to this pressurized brake fluid, a pressure difference occurs between the two sides of the SMC valve 31. That is to say, brake fluid pressure on a side of the wheel cylinders 15 and 16 is higher than that on a side of the master cylinder 1. Well-known traction control is executed in subsequent step 150 by controlling the pressure increasing control valves 21 and 22 and the pressure-reducing control valves 25 and 26 so that wheel cylinder pressure is adjusted to a desired value and adequate braking torque is applied to the wheels.

Step 160 determines whether it is time to start check control. For example, check control can be started when a predetermined time period has elapsed from the start of traction control. When an affirmative determination is made in step 160, the processing proceeds to step 170; when a negative determination is made, the processing returns to step 120. In step 170, because it is time to start check control, as shown in FIG. 4, the SMC valve 31 is temporarily turned off to open the hydraulic path between t1 and t2 (for example from 3 to 6 ms). As a result, pressure difference between the two sides of the SMC valve 31 is cancelled. That is, when the SMC valve 31 is off, high brake fluid pressure is instantaneously introduced from the wheel cylinder side to the master cylinder side. At this time, large pulsations occur particularly on the master cylinder side (lower brake fluid pressure side). If the pressure-increasing control valves 21 and 22 are off to open the hydraulic path, pulsations of brake fluid are applied to wheel cylinders 15 and 16 so that an undesirable braking torque is imparted to the wheels. Therefore, the pressure-increasing control valves 21 and 22 are on to close the hydraulic path at least during the time the SMC valve 31 is temporarily off.

In step 180, the pressure sensor 51 detects the pulsations caused by the SMC valve 31 being temporarily off in step 170 and the detected data is read in by ECU 50. Subsequent step 190 calculates a variation width (amplitude) $\Delta P$ of the pulsations detected by the pressure sensor 51. Step 200 compares the calculated variation width $\Delta P$ with a reference variation width $\Delta KP$ occurring when the SMC valve 31 and the hydraulic pump 38 function normally. When the calculated variation width $\Delta P$ is smaller than the reference variation width $\Delta KP$, there is a failure in either the differential pressure generating function of the SMC valve 31 or the brake fluid discharging function of the hydraulic pump 38 and this routine is terminated. In normal TRC control, it is estimated that the variation width $\Delta P$ ranges from 10 atm to 20 atm. Therefore, the reference variation width $\Delta KP$ can be set to about 10 atm.

According to the first embodiment, because the failure of the SMC valve 31 or the hydraulic pump 38 can be automatically and accurately detected based on the variation width of the pulsations in brake fluid, precise vehicle control can be performed. For example, when the SMC valve 31 and the hydraulic pump 38 are determined to be normal, various kinds of control can be continued with use of the SMC valve 31 and the hydraulic pump 38. On the other hand, when either the SMC valve 31 or the hydraulic pump 38 is determined to be abnormal, control may be performed to compensate for deterioration in performance of the SMC valve 31 and the hydraulic pump 38. For example, because it is considered that braking performance due to brake fluid pressure deteriorates, control for reducing the engine output of a vehicle can be added, or control for increasing the reduction amount of the engine output can be performed if engine control is being performed along with braking control in TRC control. Due to this, performance of various kinds of controls including TRC control can be continued.

When the failures of the SMC valve 31 and the hydraulic pump 38 are detected, notification may be provided to urge the driver to repair or replace the SMC valve 31 and the hydraulic pump 38. As a result, this embodiment can contribute to enhancement of safety.

It is to be noted that when check control is performed while the pressure-increasing control valves 21 and 22 are turned on (in a closed state), because hydraulic path volume to be pressurized by the hydraulic pump 38 becomes small, a time period for checking the failures of the SMC valve 31 and the hydraulic pump 38 can be shortened.

Check control is similarly executed for the second hydraulic conduit 11*b* and the failure of the SMC valve 32 or the hydraulic pump 39 can be detected.

(SECOND EMBODIMENT)

Next, the second embodiment will be described. However, the description of the portions similar to the first embodiment is omitted or simplified.

In the second embodiment, during an initial check operation, that is, when control valves and a pump in a hydraulic control circuit are in a state of stoppage as in a case where an ignition switch of a parked vehicle is turned on, the pump and the like are temporarily turned on to generate pulsations in brake fluid pressure. The pulsations in brake fluid pressure are detected and the differential pressure generating function of the SMC valve and the brake fluid discharging function of the hydraulic pump are checked based on the detected pulsations.

The constitution of the hydraulic control circuit of the second embodiment is the same as that of the first embodiment. Therefore, check control which is performed at a time of an initial check operation will be described with reference to a flowchart in FIG. 5 and a timing chart in FIG. 6. In the following description, reference numbers attached to the parts in the hydraulic control circuit are the same as those used in the first embodiment.

Figure 5:
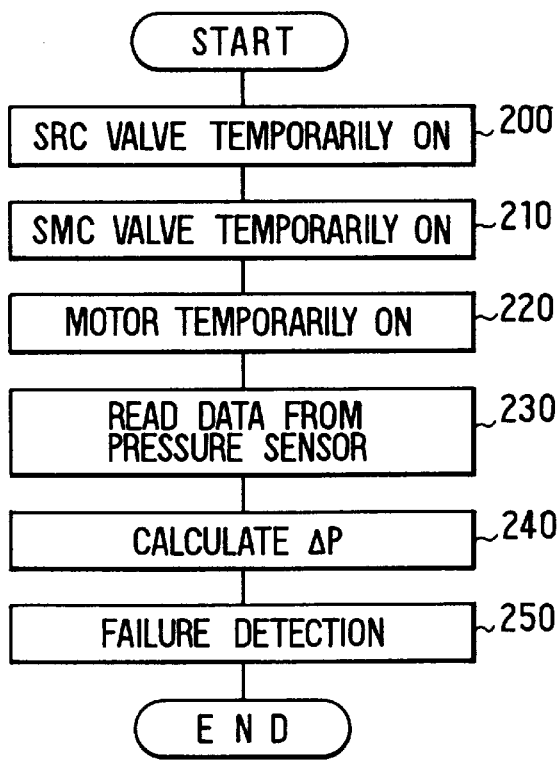
FIG. 5 is a flowchart illustrating control processing in a second embodiment.
Figure 6:
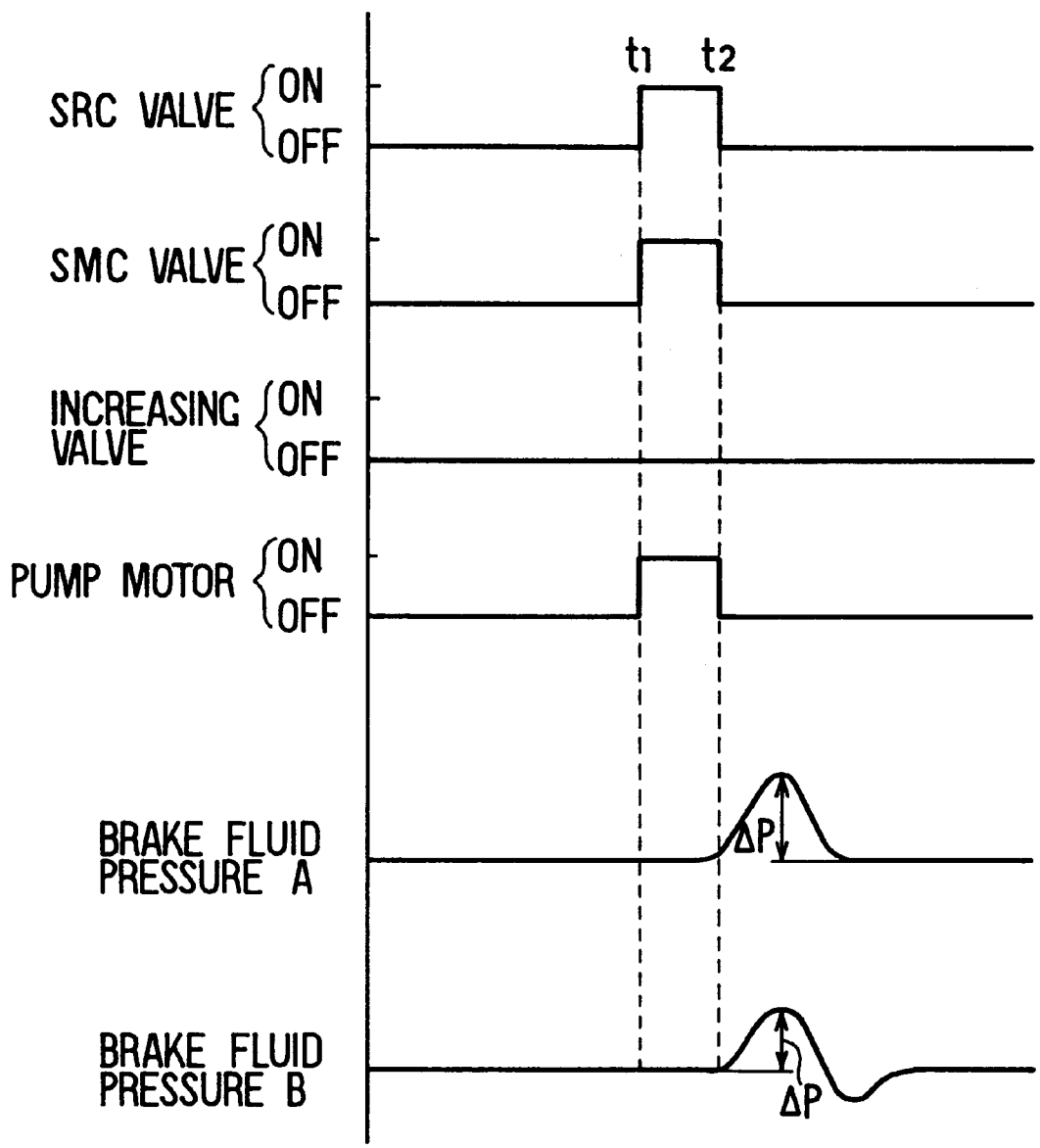
FIG. 6 is a timing chart illustrating states of each of valves and brake fluid pressure in the second embodiment.

When the ignition switch is turned on, the master cylinder 1 and the intake side of the hydraulic pump 38 are communicated by temporarily turning on the SRC valve 34 in the first hydraulic conduit 11*a* at a predetermined timing (time t1 in FIG. 6; immediately after the ignition switch is turned on) at step 205 in FIG. 5. The following step 210 temporarily turns on the SMC valve 31 and its hydraulic path is closed. Subsequent step 220 turns on the electrical pump motor 41 so that the hydraulic pump 38 is temporarily driven. As a result, the brake fluid is supplied to the hydraulic path 45*a* between the SMC valve 31 and the pressure-increasing control valves 21 and 22. It is to be noted that because the vehicle is being stopped, the pressure-increasing control valves 21 and 22 may be maintained to their off state (opening state). In the second embodiment, the pressure-increasing control valves 21 and 22 assume the off state at this time. Due to the control processing between step 205 to step 220, because the pressure difference is generated between the two sides of the SMC valve 31 and then the SMC valve is opened to cancel the pressure difference, pulsations in brake fluid pressure occur as shown in the brake fluid pressure A graph of FIG. 6. The brake fluid pressure A graph represents a waveform of brake fluid pressure variation when the brake pedal 3 is not depressed, and the brake fluid pressure B graph represents a waveform of brake fluid pressure variation when the brake pedal 3 is depressed.

The pulsations in brake fluid pressure are detected by the pressure sensor 51 in the following step 230 and the detected data is read in by the ECU 50. Step 240 calculates a variation width (amplitude) ΔP of the pulsations detected by the pressure sensor 51. Step 250 compares the calculated variation width ΔP with a reference variation width ΔKP occurring when the SMC valve 31 and the hydraulic pump 38 function normally. When the calculated variation width ΔP is smaller than the reference variation width ΔKP, it is determined that there is a failure in either the differential pressure generating function of the SMC valve 31 or the brake fluid discharging function of the hydraulic pump 38 and this routine is terminated.

Therefore, according to the second embodiment, the failure of the SMC valve 31 or the hydraulic pump 38 can be automatically and accurately detected based on the variation width of the pulsations in brake fluid pressure similarly to the first embodiment. Further, because check control can be made prior to when the vehicle starts to move, safety can be further enhanced.

In a vehicle having an automatic transmission, when the ignition switch of the parked vehicle is turned on, a brake pedal 3 is depressed and master cylinder pressure is generated. In this case, brake fluid pressure varies as shown in the waveform of the brake fluid pressure B graph in FIG. 6. The failure of the SMC valve 31 or the hydraulic pump 38 can be detected based on variation width ΔP similarly to the case of the brake fluid pressure A graph.

(THIRD EMBODIMENT)

Next, the third embodiment will be described. However, the description of the portions similar to the first embodiment is omitted or simplified.

In the third embodiment, when the vehicle is running at low speed, and thus, when control valves and a pump in a hydraulic control circuit are in a state of stoppage, the pump and the like are temporarily turned on to generate pulsations in brake fluid pressure. The pulsations in brake fluid pressure are detected and the differential pressure generating function of the SMC valve and the brake fluid discharging function of the hydraulic pump are checked based on the detected pulsations.

The constitution of the hydraulic control circuit of the third embodiment is the same as that of the first embodiment. Therefore, check control which is performed at a time of the vehicle running at low speed will be described with reference to a flowchart in FIG. 7 and a timing chart in FIG. 8. In the following description, reference numbers attached to the parts in the hydraulic control circuit are the same as those used in the first embodiment.

Figure 7:
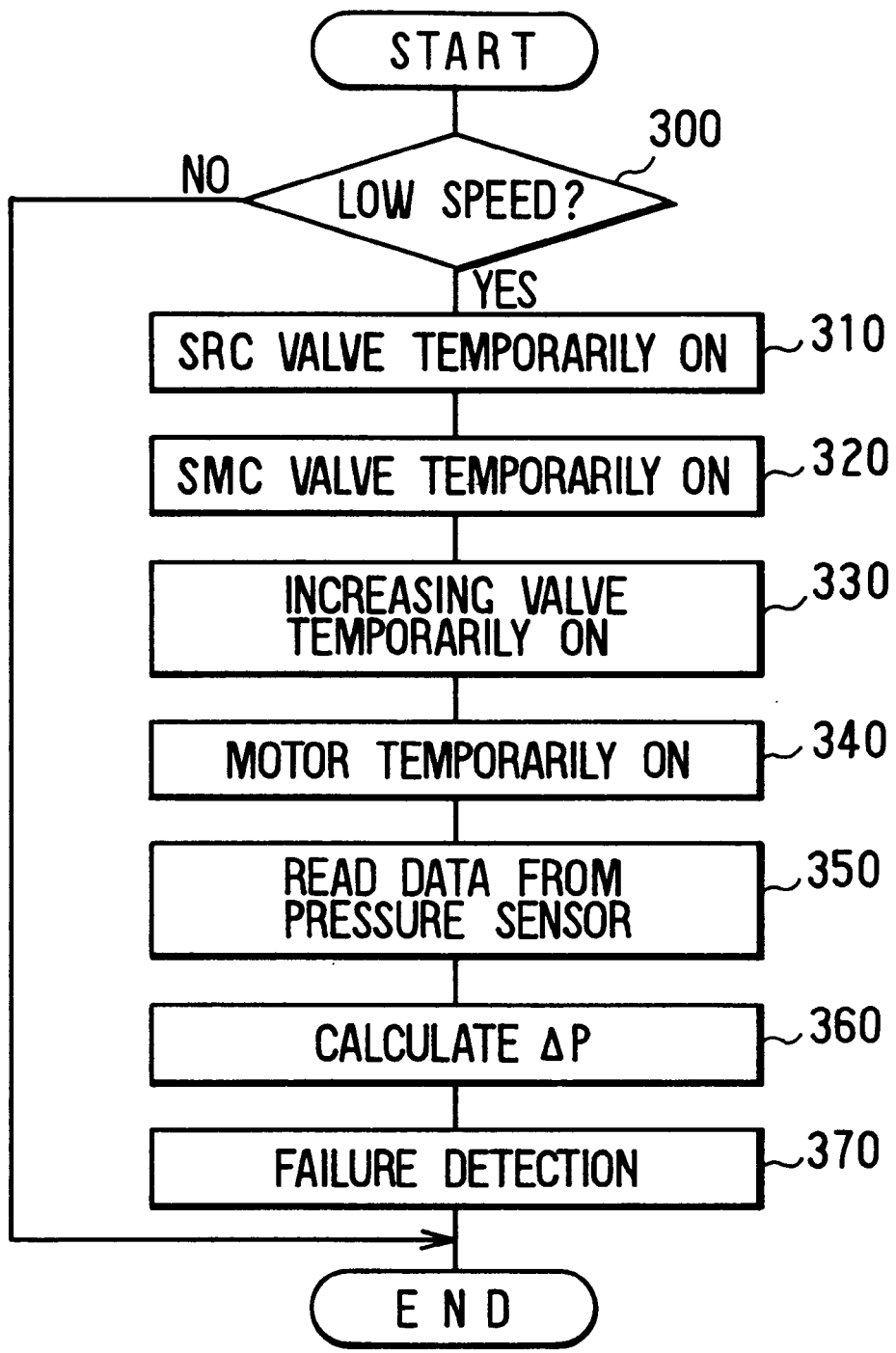
FIG. 7 is a flowchart illustrating control processing in the third embodiment.
Figure 8:
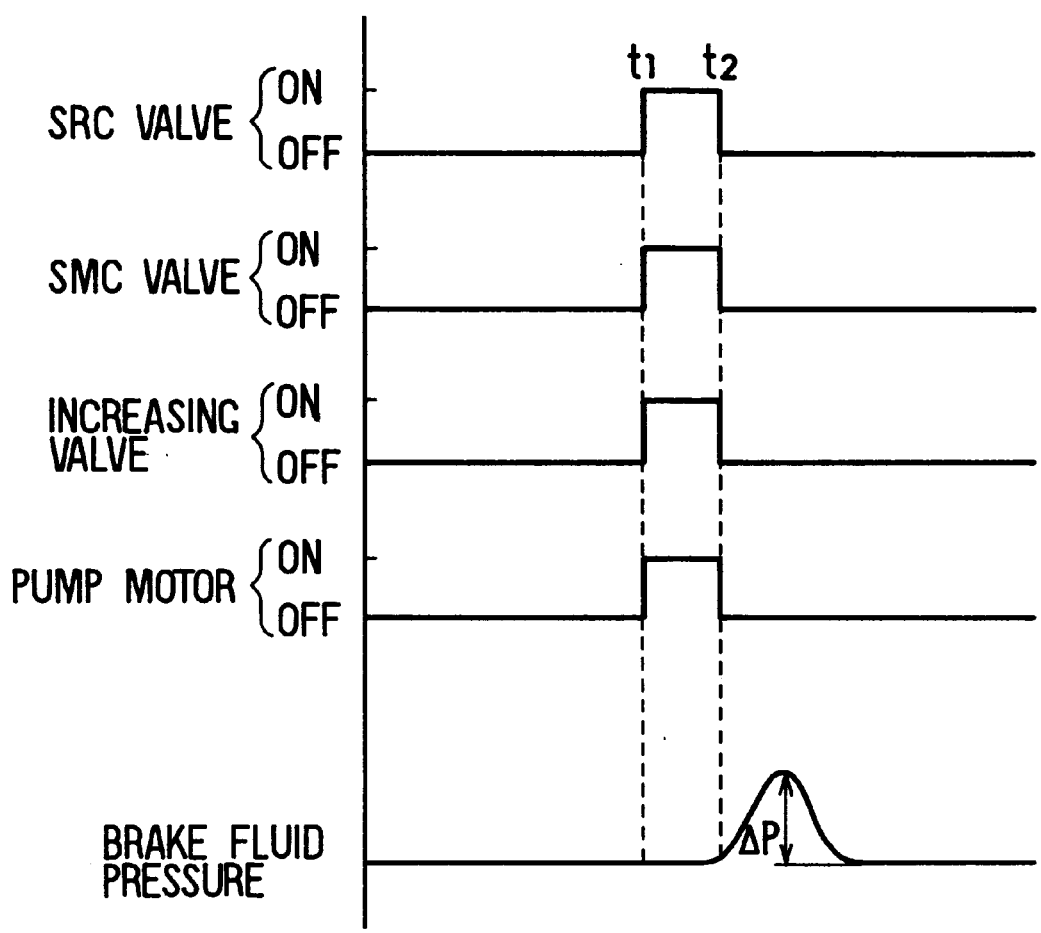
FIG. 8 is a flowchart illustrating control processing in a third embodiment.

Step 300 of FIG. 7 determines whether a running speed of the vehicle is lower than a predetermined speed. When an affirmative determination is made herein, the processing advances to step 310; when a negative determination is made, this routine is terminated. Step 310 communicates the master cylinder 1 and the intake side of the hydraulic pump 38 by temporarily turning on the SRC valve 34 in the first hydraulic conduit 11a at a predetermined timing (time t1 in FIG. 8). The following step 320 temporarily turns on the SMC valve 31 and its hydraulic path is closed. Subsequent step 330 turns on the pressure-increasing control valves 21 and 22 and their hydraulic paths are closed. The reason why the pressure-increasing control valves 21 and 22 are closed is that application of brake fluid to the wheel cylinders 15 and 16 is prevented. Step 340 turns on the electrical pump motor 41 so that the hydraulic pump 38 is temporarily driven. As a result, the brake fluid is supplied to the hydraulic path 45a between the SMC valve 31 and the pressure-increasing control valves 21 and 22. Due to the control processing between step 310 to step 340, because the pressure difference is generated between the two sides of the SMC valve 31 and then the SMC valve is opened to cancel the pressure difference, pulsations in brake fluid pressure occur as shown in FIG. 8.

The pulsations in brake fluid pressure is detected in the following step 350 by the pressure sensor 51 and the detected data is read in by the ECU 50. Step 360 calculates a variation width (amplitude) ΔP of the pulsations detected by the pressure sensor 51. Step 370 compares the calculated variation width ΔP with a reference variation width ΔKP occurring when the SMC valve 31 and the hydraulic pump 38 function normally. When the calculated variation width ΔP is smaller than the reference variation width ΔKP, it is determined that there is a failure in either the differential pressure generating function of the SMC valve 31 or the brake fluid discharging function of the hydraulic pump 38 and this routine is terminated.

Therefore, according to the third embodiment, the failure of the SMC valve 31 or the hydraulic pump 38 can be automatically and accurately detected based on the variation width of the pulsations in brake fluid pressure similarly to the first embodiment. Further, because check control can be executed other than a traction control time, safety can be further enhanced.

(FOURTH EMBODIMENT)

Next, the fourth embodiment will be described. However, the description of the portions similar to the first embodiment is omitted or simplified.

Figure 9:
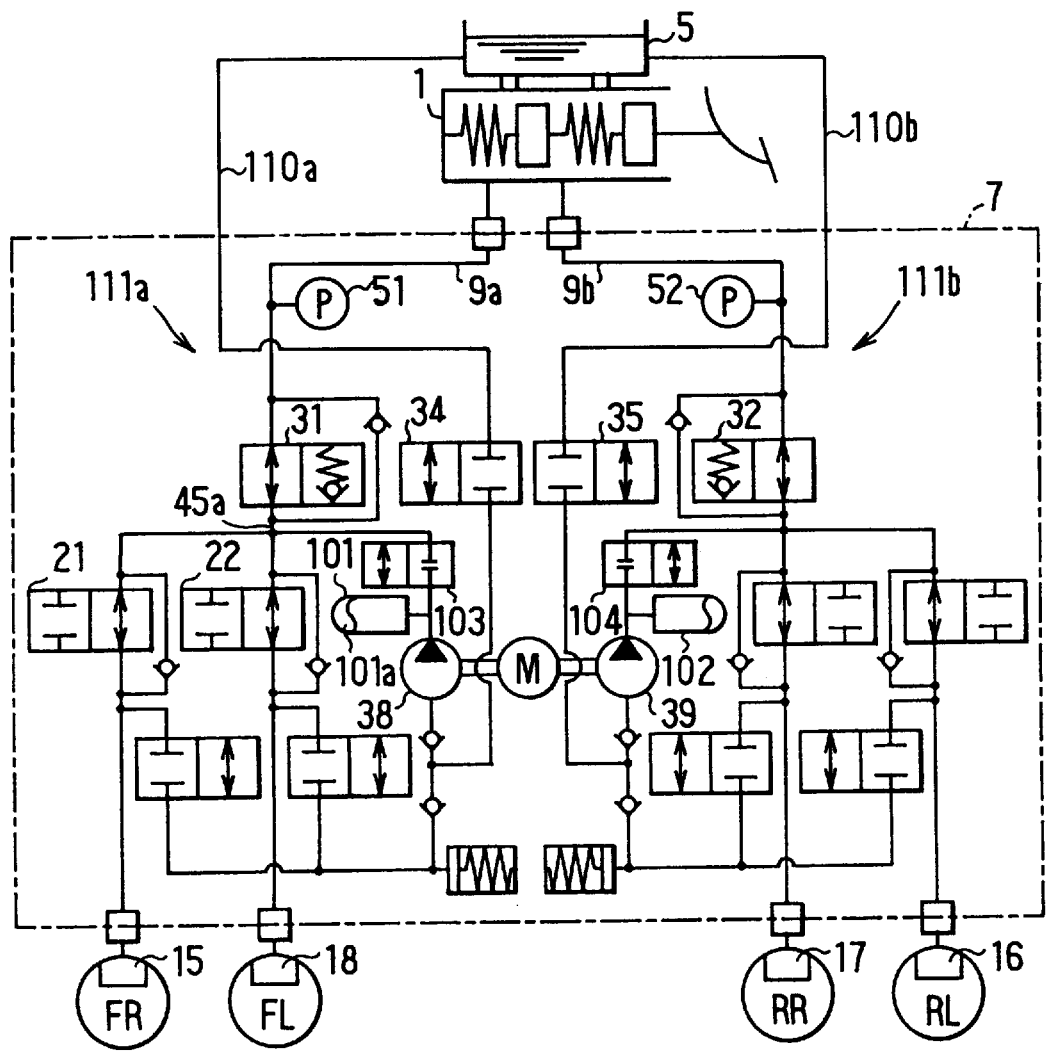
FIG. 9 is a model diagram illustrating a structure of a vehicular brake apparatus according to a fourth embodiment.

In the fourth embodiment, as shown in FIG. 9, the wheel cylinder 15 of the front right wheel and the wheel cylinder 18 of the front left wheel are connected via the first hydraulic conduit 111a and the wheel cylinder 17 of the rear right wheel and the wheel cylinder 16 of the rear left wheel are connected via the first hydraulic conduit 11b. That is, in the fourth embodiment, the present invention is applied to a vehicle having a front axle/rear axle split system.

In the foregoing embodiments, the hydraulic control circuit has a master cylinder self-supplying structure to perform traction control and power brake control. That is, the hydraulic pump 38 draws in brake fluid from a hydraulic path between the master cylinder 1 and the D-valve 42 through the SRC valve 34 and discharges brake fluid into a hydraulic path on a side of the wheel cylinders 15 and 16 from the D-valve 42 (from the SMC valve 31 during a closed state thereof). As a result, brake fluid pressure on a side of the wheel cylinders 15 and 16 was maintained to be higher than that on a side of the master cylinder 1 by the D-valve 42 or the SMC valve 31.

On the contrary, in the fourth embodiment, as shown in FIG. 9 the hydraulic control circuit has a reservoir self-supplying structure instead of the master cylinder self-supplying structure. In detail, a hydraulic path 110c is formed so that the hydraulic pump 38 can draw in brake fluid from a master reservoir 5 provided with the master cylinder 1 through the SRC valve 34. Brake fluid discharged from the hydraulic pump 38 flows into the hydraulic path 45a through a control valve 103 for accumulating use. The control valve 103 assumes a closed state during normal braking so that the accumulator 101 can accumulate brake fluid at high pressure. The brake fluid at high pressure accumulated in the accumulator 101 is utilized for increasing brake fluid pressure (wheel cylinder pressure) at an initial stage of traction control, power brake control or trace control. Therefore, the control valve 103 is driven into an opening state in response to the start of traction control, power brake control, or trace control (control for turning a vehicle in accordance with the steering operation of a driver by providing pressurized brake fluid to wheel cylinder(s)). When traction control, power brake control or trace control is started, the SMC 34 valve which normally assumes the closed state is driven into an open state so that the hydraulic pump 38 can draw in brake fluid from the master reservoir 5. At this time, the SMC valve 31 is driven into a closed state so that brake fluid pressure on a wheel cylinder side becomes higher than brake fluid pressure on a master cylinder side. When brake fluid at high pressure in the accumulator 101 has been consumed in accompaniment with the performance of traction control or the like, high pressure brake fluid is introduced into the accumulator 101 by driving the hydraulic pump 38 and setting the control valve 103 at a closed state when traction control or the like ends. That is, high pressure brake fluid is always accumulated in the accumulator 101.

Gas 101a is sealed by a gas-impermeable film within the accumulator 101. This gas 101a enables pressurized brake fluid to be effectively accumulated in the accumulator 101. That is, although brake fluid is incompressible, pressure of brake fluid is easily established in the accumulator 101 by use of compressible gas 101a.

A hydraulic path 110b, an accumulator 102 and a control valve 104 for accumulating use are provided for the second hydraulic conduit 111b similarly to the first hydraulic conduit 111a.

Figure 10:
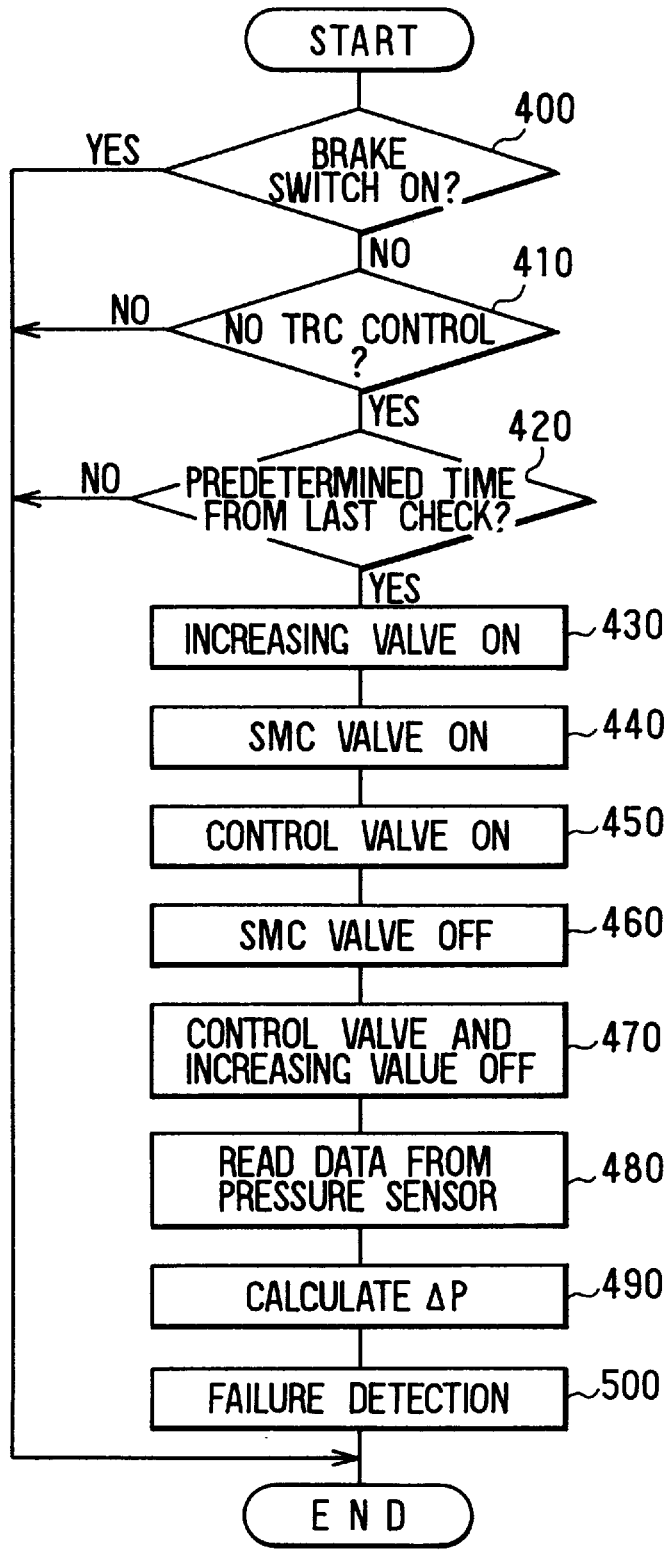
FIG. 10 is a flowchart illustrating control processing in the fourth embodiment.

Next, control processing for detecting a failure of the hydraulic pump 38, the control valve 103, the accumulator 101, or the SMC valve 31 is described with reference to a flowchart in FIG. 10. Step 400 determines whether a vehicle is in a braking state based on a signal detected by a brake switch. When an affirmative determination is made herein, this routine is terminated; when a negative determination is made, the processing advances to step 410 which determines whether traction control, power brake control, or the like is not being performed. If, for example, traction control is now being performed, this routine is terminated; if traction control is not being performed, the processing advances to step 420. Step 420 determines whether a predetermined time period (for example, a time period corresponding to one month) has elapsed since the last failure detection, i.e., the last checking operation for the hydraulic pump 38, the control valve 103, the accumulator 101 and the SMC valve 31.

When the control starting conditions in steps 400 to 420 are all satisfied, failure detection processing of step 430 and the following steps starts. Step 430 turns on the pressure-increasing control valves 21 and 22 to close the hydraulic path. As a result, brake fluid is prevented from flowing from the accumulator 101 to the wheel cylinder side. Step 440 tunes on the SMC valve 31 to interrupt the communication between the master cylinder 1 and the wheel cylinders 15 and 18. Step 450 turns the control valve 103 on. At this time, brake fluid pressure from the accumulator 101 is imparted to the hydraulic path 45a. It is preferable that the control valve 103 is turned on continuously for a predetermined time (for example, 100 ms) and brake fluid pressure is sufficiently transmitted to the hydraulic path.

Step 460 turns off the SMC valve 31 to open the hydraulic path. As a result, if the hydraulic pump 38, the accumulator 101 and so on function normally, high pressure brake fluid in the hydraulic path 45a flows toward the master cylinder 1. In step 470, because actuation of valves for detecting the failure of the hydraulic pump 38 or the like ends, the control valve 103 for accumulating use and the pressure-increasing valves 21 and 22 are turned off to be returned to their normal states. In the following steps 480 to 500, the failure of the actuator such as the hydraulic pump 38, the control valve 103, the accumulator 101 or the SMC valve 31 is detected based on the variation width ΔP of the pulsations in brake fluid pressure in the same way as the forgoing embodiments. In detail, an accumulating function of the accumulator 101, a differential pressure generating function of the SMC valve, and a pressure maintaining and releasing function of the control valve 103 can be checked at the same time. That is, if there is at least one failure among these functions, occurrence of the failure is determined at step 500. Further, the failure of the brake fluid discharging function of the hydraulic pump 38 can be detected. If the failure of the hydraulic pump 38 has occurred, brake fluid pressure accumulated in the accumulator 101 becomes insufficient. Therefore, the failure of the accumulator 101 is caused by leakage of brake fluid from the accumulator 101 as well as insufficient discharge performance of the hydraulic pump 38, and so the failure of the hydraulic pump 38 is detected as the failure of the accumulator 101.

It is to be noted that when the failure of the SMC valve 31, the control valve 103, the accumulator 101, or the hydraulic pump 38 are detected, notification may be provided to urge the driver to repair or replace the SMC valve 31, the control valve 103, the accumulator 101, or the hydraulic pump 38. As a result, this embodiment can contribute to enhancement of safety.

Check control is similarly executed for the second hydraulic conduit 111b and the failure of the SMC valve 32, the hydraulic pump 39 or the like can be detected.

(FIFTH EMBODIMENT)

Figure 11:
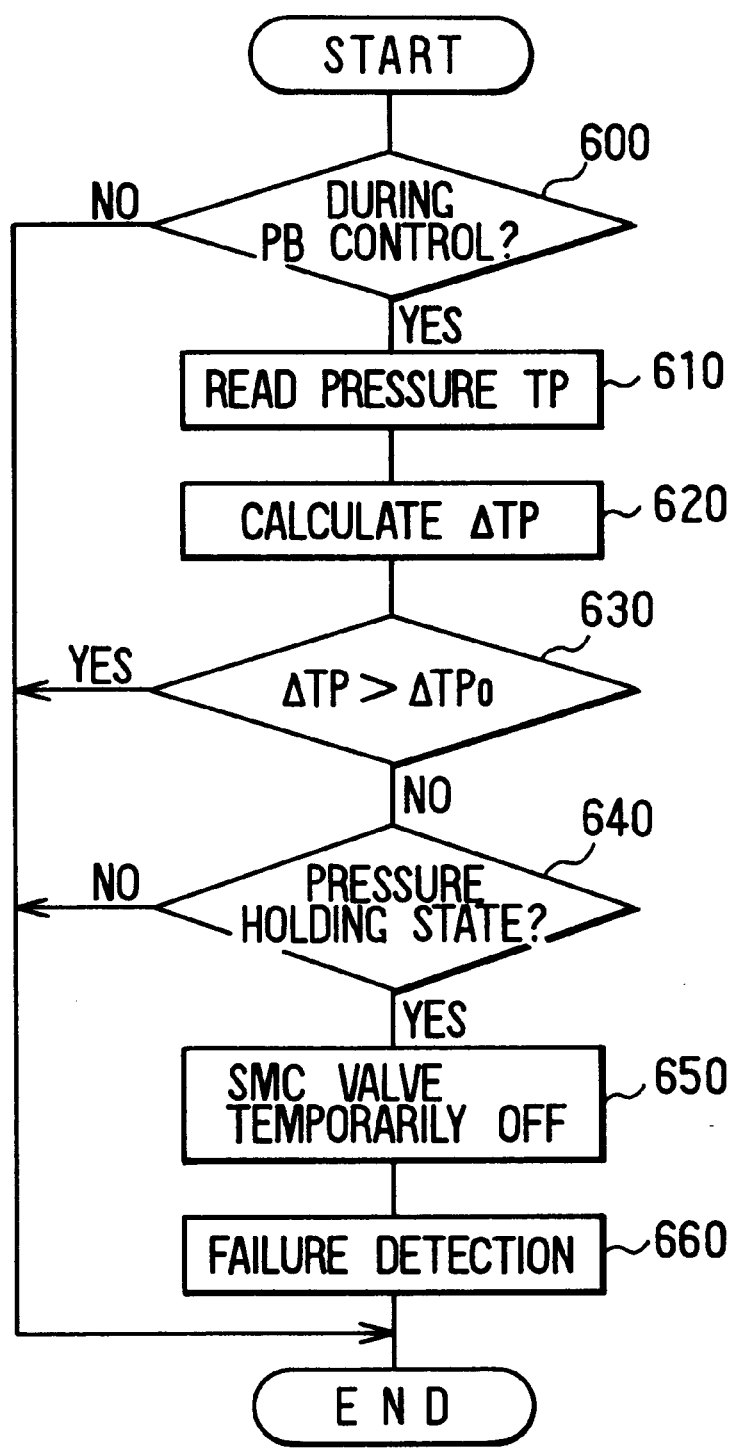
FIG. 11 is a flowchart illustrating control processing in a fifth embodiment.
Figure 12:
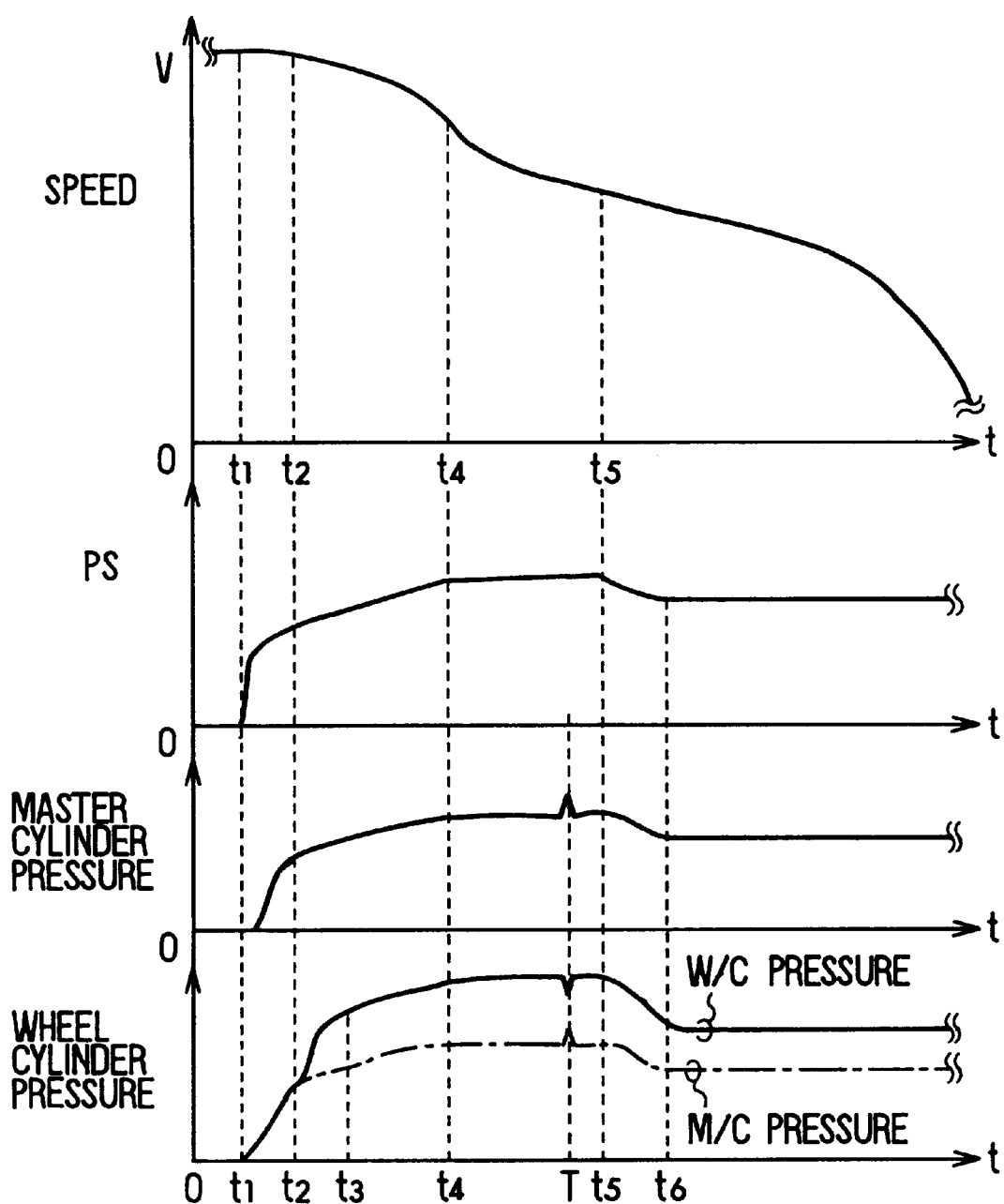
FIG. 12 is a timing chart illustrating a state of brake fluid pressure and the like in the fifth embodiment.

Next, the fifth embodiment will be described with reference to a flowchart in FIG. 11 and a timing chart in FIG. 12.

In the fifth embodiment, check control is performed while the vehicle is being braked so that brake fluid pressure is applied to the wheel cylinders.

Steps 600 to 630 show control starting conditions for starting check control. Step 600 determines based on a signal from a brake switch, whether the brake pedal has been urgently depressed, i.e., whether power brake control is being performed. When an affirmative determination is made herein, the processing advances to step 610; when a negative determination is made, this routine is terminated. In step 610, the pressure TP detected by the pressure sensor 51 is read in by ECU 50 as a master cylinder pressure. In step 620, a variation width ΔTP of the master cylinder pressure within a predetermined time period (per unit time) is calculated. Step 630 determines whether the variation width ΔTP is greater than a comparison value ΔTPO. When an affirmative determination is made herein, this routine is terminated; when a negative determination is made, that is, when variation width ΔTP is small to some extent, the processing advances to step 640. Step 640 determines whether a holding state in which wheel cylinder pressure is held at a substantially constant value is being established. In power brake (PB) control, brake fluid pressure which is greater than a master cylinder pressure generated by a driver's brake pedal operation is applied to a wheel cylinder. Thus, even if the driver does not have sufficient physical strength to strongly depress the brake pedal, sufficient brake fluid pressure can be promptly applied to the wheel cylinder. PB control is performed by amplifying a master cylinder pressure at a predetermined ratio by the hydraulic pump 38 and the D-valve 42 or the SMC valve and holding the amplified pressure which is applied to the wheel cylinder. In the holding state, the hydraulic motor 38 is turned off. To hold brake fluid pressure at a constant value, the pressure-increasing control valve may be turned on (in a closed state). When a determination is made that the holding state of the wheel cylinder pressure is being established in step 640, the processing advances to step 650 to execute failure detection.

In step 650, PB control is being executed and the SMC valve 31 has been closed to hold the wheel cylinder pressure higher than the master cylinder pressure. That is, the pressure difference has been established between the wheel cylinder pressure and the master cylinder pressure. Therefore, when the SMC valve 31 is temporarily turned off (in an opening state) in step 650, brake fluid pressure pulsations occur on a master cylinder side of the SMC valve 31. In step 660, similarly to the foregoing embodiments, the failure detection of the parts to form the pressure difference is executed based on the brake fluid pressure pulsations. The parts to form the pressure difference include the SRC valve 34, the hydraulic pump 38, the pump motor 41, the control valve 103 for accumulating use, the accumulator 101 and the SMC valve 31. If any of these parts has any failure, for example, if the SRC valve 34 cannot open the hydraulic path between the master reservoir 105 and the hydraulic pump 38, the pressure difference is not established between the master cylinder pressure and the wheel cylinder pressure. Therefore, even when the SMC valve 31 is temporarily opened, the brake fluid pressure pulsations do not occur with the result that the failure of the parts is determined. In addition, according to the present embodiment, the failure such as follows can be detected. When gas sealed by the gas-impermeable film is released into the brake fluid, for example, through a torn gas impermeable film, even if the hydraulic pump, the valves and so on work normally, the wheel cylinder pressure cannot rise sufficiently. Therefore, a sufficient pressure difference is not established between the wheel cylinder pressure and the master cylinder pressure. In this case, because the wheel cylinder pressure is relatively low, effective brake performance cannot be expected. According to the present invention, the failure as described above can also be detected.

Next, the operation of the present embodiment will be described with reference to a timing chart in FIG. 12.

At a time t1, the brake pedal depression starts and the vehicle begins to be braked. At a time t2, PB control starts. Starting conditions for PB control are, for example, a brake pedal stroke greater than a predetermined value, a brake pedal stroke speed higher than a predetermined speed, a vehicle deceleration greater than a predetermined deceleration and so on. That is, PB control is executed on a panicky braking operation of a driver. Between a time t2 and a time t3, the wheel cylinder pressure is amplified to be higher than the master cylinder pressure. That is, the wheel cylinder pressure is increased by the hydraulic pump 38 and the SMC valve 31 with a pressure increase gradient higher than that of the master cylinder pressure between the time t2 and the time t3 which is a predetermined time period. After the time t3, the amplification of the wheel cylinder pressure is made in response to the driver's brake pedal operation. Since the brake pedal is gradually stepped in and the master cylinder pressure is gradually increased between the time t3 and a time t4, the wheel cylinder pressure is also gradually increased in response thereto. Between the time t1 and the time t4, because the master cylinder pressure varies (increases) in response to the driver's brake pedal operation, the failure detection is not executed. However, between the time t4 and a time t5, because there is no brake pedal stroke variation and therefore the master cylinder pressure is substantially constant, a negative determination is made in the above-described step 630. That is, it is determined that the variation width $\Delta TP$ of the master cylinder pressure is lower than the comparison value $\Delta TP0$. Because the master cylinder pressure is substantially constant between the time t4 and the time t5, the wheel cylinder pressure is held at a substantially constant pressure higher than the master cylinder pressure. Therefore, an affirmative determination is made at the above-described step 640 and the failure detection is started. The failure detection is executed at a time T, that is, the SMC valve 31 is temporarily opened. As a result, variations in brake fluid pressure appear in both the master cylinder pressure and the wheel cylinder pressure. It is to be noted that the failure detection may be executed when it is ascertained that the master cylinder pressure and the wheel cylinder pressure are stable after a predetermined time period has passed since the time t4 at which the master cylinder pressure becomes unchanged and the wheel cylinder pressure enters the holding state.

Between the time t5 and a time t6, the master cylinder pressure falls in accompaniment with the brake pedal being returned a little. As a result, the wheel cylinder pressure also falls off. For this reason, the failure detection is not executed between the time t5 and the time t6.

When the starting conditions for starting the failure detection are set as described above, the failure detection can be performed even while PB control is being performed. In addition, the failure such as a leakage of the accumulator gas into brake fluid can be detected as well.

The present invention is not limited to the above-described embodiments but can be put into practical use in various ways within the spirit of the appended claims.

Figure 13:
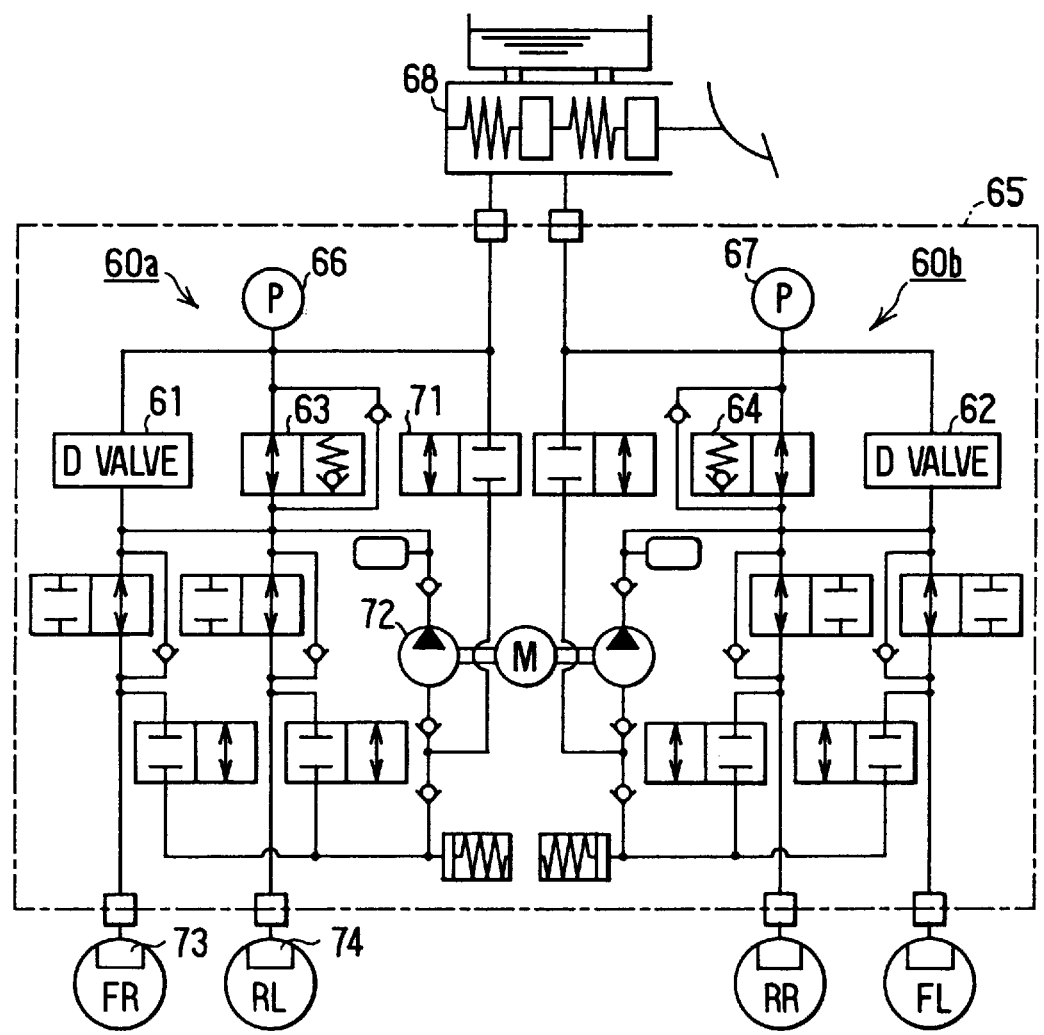
FIG. 13 is a model diagram illustrating a structure of a modified vehicular brake apparatus.

For example, various kinds of hydraulic control circuits can be adopted in place of the hydraulic circuits shown in FIG. 1 and FIG. 9. One example of such a hydraulic control circuit is shown in FIG. 13. In FIG. 13, D-valves 61 and 62 are connected in parallel to the SMC valves 63 and 64, respectively, in the first and second hydraulic conduits 60a and 60b. The pressure sensors 66 and 67 are provided on a master cylinder side (lower pressure side) of the SMC valves 63 and 64, respectively. ABS control and PB control can be executed by the hydraulic control circuit 65 shown in FIG. 13.

Particularly, the hydraulic control circuit 65 has an advantage of rapid response in forming the pressure difference.

The hydraulic control circuit may perform vehicle-motion stabilizing control (which is control for enhancing stability of the vehicle at a time of a vehicle turning by providing brake torque to an adequate wheel cylinder), automatic brake control to prevent the vehicle from colliding with another vehicle or the like, as brake control during no operation of the brake pedal. The check control (failure detection) may be executed in such brake control in addition to in traction control.

When the pressure sensor is disposed on a master cylinder side (lower pressure side) of the SMC valve, because the magnitude of brake fluid pressure pulsation becomes large, variation width of the pulsations can be easily detected. However, because the pulsations occur on a wheel cylinder side of the SMC valve, the pressure sensor can be disposed on the wheel cylinder side. It is to be noted that when the pressure sensor is provided, for example, in the hydraulic path 45a, the waveform of the brake fluid pressure pulsations is opposite to that in the forgoing embodiments. That is, when the SMC valve is opened, the wheel cylinder pressure is temporarily lowered.

In a vehicle having a brake booster which boosts the brake pedal depressing force and transmits the boosted depressing force to the master cylinder, the malfunction of the brake booster may be detected. When the malfunction of the brake booster is detected, the hydraulic pump and the SMC valve can be controlled to compensate for the boosting effect of the brake booster. As a result, the wheel cylinder pressure is increased more than the master cylinder pressure. At this time, the SMC valve can be temporarily opened to generate brake fluid pressure pulsations and detect the failure of the hydraulic pump and so on. It is to be noted that the way of control of the hydraulic pump and the SMC valve is the same as in traction control that was described in the first embodiment.

In the above-described embodiments, the SMC valve 31 or the SRC valve 34 was a two-position valve having an open position and a closed position. However, a linear control valve in which a lift amount of a valve body can be linearly controlled in response to current value (duty ratio) provided to a solenoid coil thereof can be adopted as the SMC valve or the SRC valve. When the linear control valve constitutes the SMC valve, the valve body of the linear control valve is moved to a intermediate position between the opening position and the closed position. As a result, the pressure difference between the master cylinder pressure and the wheel cylinder pressure is held due to the throttle effect of the linear control valve. In addition, retention of the pressure difference can be arbitrarily controlled and so the amplification of the wheel cylinder pressure can be executed in response to a brake pedal operation of a driver with an arbitrary amplification ratio.

Further, when the linear control valve is used as the SMC valve, the failure detection can be executed in the same way as the forgoing embodiments.

When the linear control valve is used as the SRC valve, intake and discharge brake fluid amount of the hydraulic pump can be controlled through the use of the throttle effect of the linear control valve. Due to this, brake fluid pulsations in intake and discharge operations can be suppressed and noise thereof can be lowered. Further, even when the linear control valve is used as the SRC valve, the failure of the linear control valve can be detected by check control.

In the foregoing embodiments, the master cylinder pressure is generated in response to the brake pedal operation of the driver because the master cylinder and the brake pedal are mechanically interconnected. However, the present invention can be applied to a brake-by-wire type brake apparatus in which a brake pedal operation of a driver is converted into an electrical signal and a master cylinder pressure is generated in response to the electrical signal or to an automatic brake apparatus in which a master cylinder pressure is generated independently from a brake pedal operation of a driver by automatically introducing air into an air chamber of a vacuum brake booster.

In the forgoing embodiments, pulsations in brake fluid pressure were generated by closing the SMC valve 31. However, the pulsations in brake fluid pressure can be generated, for example, by temporarily stopping the hydraulic pump 38 or temporarily interrupting an intake side of the hydraulic pump 38 using the SRC valve.

What is claimed is:

1. A brake control apparatus for a vehicle, comprising:
   a brake fluid pressure generating device which generates brake fluid pressure,
   a wheel braking force generating device which causes braking force to be generated at a wheel by using brake fluid pressure generated by said brake fluid pressure generating device;
   a pressure difference generating device, disposed in a hydraulic path connecting said brake fluid pressure generating device and said wheel braking force generating device, which generates a pressure difference between brake fluid pressure on a side of said brake fluid pressure generating device and brake fluid pressure on a side of said wheel braking force generating device; and
   determining means for determining a failure of said pressure difference generating device based on pulsations in brake fluid pressure occurring when said pressure difference generating device is driven to cancel said pressure difference, wherein
   said pressure difference generating device includes a pressure amplifying device which generates brake fluid pressure greater than brake fluid pressure generated by said brake fluid pressure generating device and applies greater brake fluid pressure to said wheel braking force generating device; and
   said determining means drives said pressure difference generating device so that brake fluid having said higher brake fluid pressure flows toward said brake fluid pressure generating device, whereby said pulsations in brake fluid pressure are generated.

2. A brake control apparatus for a vehicle as recited in claim 1, wherein said determining means determines the failure of said pressure difference generating device based on pulsations in brake fluid pressure of a lower brake fluid pressure side among said brake fluid pressure generating device and said wheel braking force generating device.

3. A brake control apparatus for a vehicle as recited in claim 1, wherein said pressure difference generating device includes a control valve which controls open and closed states of said hydraulic path and a hydraulic pump which draws in and discharges brake fluid.

4. A brake control apparatus for a vehicle as recited in claim 3, wherein said hydraulic pump draws in brake fluid between said brake fluid pressure generating device and said control valve and discharges brake fluid between said control valve and said wheel braking force generating device to form said pressure difference.

5. A brake control apparatus for a vehicle as recited in claim 3, wherein said pressure difference is cancelled by said control valve opening said hydraulic path.

6. A brake control apparatus for a vehicle as recited in claim 3, wherein said pressure difference is cancelled by stopping said hydraulic pump.

7. A brake control apparatus for a vehicle as recited in claim 1, further comprising:
   a pressure sensor, provided between said brake fluid pressure generating device and said control valve, which detects pressure of brake fluid, wherein said determining means determines the failure of said pressure difference generating device based on brake fluid pressure detected by said pressure sensor.

8. A brake control apparatus for a vehicle as recited in claim 1, wherein said determining means determines the failure of said pressure difference generating device while brake control is being performed.

9. A brake control apparatus for a vehicle as recited in claim 1, wherein said determining means determines the failure of said pressure difference generating device when said vehicle is started.

10. A brake control apparatus for a vehicle as recited in claim 1, wherein said determining means determines the failure of said pressure difference generating device while said vehicle is running at low speed without brake control performed.

11. A brake control apparatus for a vehicle comprising:
a brake fluid pressure generating device which generates brake fluid pressure;
a wheel braking force generating device which causes braking force to be generated at a wheel by using brake fluid pressure generated by said brake fluid pressure generating device;
a first hydraulic path connecting said brake fluid pressure generating device and said wheel braking force generating device;
a high pressure source for supplying brake fluid pressure to said wheel braking force generating device independently from said brake fluid pressure generating device;
a second hydraulic path for transmitting brake fluid pressure of said high pressure source into said first hydraulic path;
a pressure difference generating device disposed in said first hydraulic path on a side of said brake fluid pressure generating device from a point to which said second hydraulic path is connected, which generates a pressure difference between brake fluid pressure on a side of said brake fluid pressure generating device and brake fluid pressure on a side of said wheel braking force generating device when said high pressure source supplies brake fluid pressure to said wheel braking force generating device; and
determining means for determining an operating state of said pressure difference generating device with use of said pressure difference,
wherein said determining means determines the operating state of said pressure difference generating device when brake fluid pressure on a side of said wheel braking force generating device is held at a substantially constant value for a predetermined time period.

12. A brake control apparatus for a vehicle comprising:
a brake fluid pressure generating device which generates brake fluid pressure;
a wheel braking force generating device which causes braking force to be generated at a wheel by using brake fluid pressure generated by said brake fluid pressure generating device;
a first hydraulic path connecting said brake fluid pressure generating device and said wheel braking force generating device;
a high pressure source for supplying brake fluid pressure to said wheel braking force generating device independently from said brake fluid pressure generating device;
a second hydraulic path for transmitting brake fluid pressure of said high pressure source into said first hydraulic path;
a pressure difference generating device disposed in said first hydraulic path on a side of said brake fluid pressure generating device from a point to which said second hydraulic path is connected, which generates a pressure difference between brake fluid pressure on a side of said brake fluid pressure generating device and brake fluid pressure on a side of said wheel braking force generating device when said high pressure source supplies brake fluid pressure to said wheel braking force generating device; and
determining means for determining an operating state of said pressure difference generating device with use of said pressure difference,
wherein said determining means periodically determines the operating state of said pressure difference generating device every predetermined reference time period.

13. A brake control apparatus for a vehicle as recited in claim 11 or 12, wherein said determining means determines whether at least one of said pressure difference generating device and said high pressure source has failed.

14. A brake control apparatus for a vehicle as recited in claim 11 or 12, wherein said high pressure source comprises a pump which draws in brake fluid from a master reservoir exclusively provided with a master cylinder, pressurizes and discharges brake fluid, an accumulator which accumulates brake fluid of high pressure discharged from said pump, and a control valve which holds high pressure brake fluid accumulated in said accumulator.

15. A brake control apparatus for a vehicle as recited in claim 14, wherein said accumulator has compressible gas and a retaining member for retaining said compressible gas within said accumulator.

16. A brake control apparatus for a vehicle as recited in claim 14, wherein said pressure difference generating device has a control valve for holding pressure difference between brake fluid pressure on a side of said brake fluid pressure generating device and brake fluid pressure on a side of said wheel braking force generating device when said high pressure source supplies brake fluid pressure to said wheel braking force generating device.

17. A brake control apparatus for a vehicle as recited in claim 16, wherein said control valve is a two-position valve having an opening position and a closed position.

18. A brake control apparatus for a vehicle as recited in claim 16, wherein said control valve is a linear control valve which linearly controls brake fluid amount flowing between said brake fluid pressure generating device and said wheel braking force generating device.

19. A brake control apparatus for a vehicle as recited in claim 16, further comprising:
trace control means for automatically providing braking torque to each of wheel cylinders so that said vehicle turns in accordance with a turning operation of a driver,
wherein said determining means determines the operation state of at least one of said control valve and said pump which are driven by said trace control means.

20. A brake control apparatus for a vehicle as recited in claim 16, further comprising:
power brake control means for assisting to promptly generate braking force in said vehicle during a panicky braking operation of a driver,
wherein said determining means determines the operation state of at least one of said control valve and said pump which are driven by said power brake control means.

21. A brake control apparatus for a vehicle as recited in claim 11 or 12, wherein:

said brake fluid pressure generating device is a master cylinder which generates a master cylinder pressure in response to a brake pedal operation of a driver; and said determining means is provided with a master cylinder pressure sensor which detects brake fluid pressure on a master cylinder side of said control valve.

22. A brake control apparatus for a vehicle as recited in claim 21, wherein said determining means determines the operating state of said pressure difference generating device when output change of said master cylinder pressure sensor per unit time is within a predetermined range.

23. A brake control apparatus for a vehicle as recited in claim 11 or 12, wherein said determining means has braking state detecting means for detecting that said vehicle is in a non-braking state, and said determining means determines the operating state of said pressure difference generating device when said vehicle is in a non-braking state.

24. A brake control apparatus for a vehicle as recited in claim 11 or 12, wherein said brake fluid pressure generating device generates brake fluid pressure in response to an electrical control signal which corresponds to a brake pedal operation of a driver.

25. A brake control apparatus for a vehicle comprising:

a brake fluid pressure generating device which generates brake fluid pressure;

a wheel braking force generating device which causes braking force to be generated at a wheel by using brake fluid pressure generated by said brake fluid pressure generating device;

a first hydraulic path connecting said brake fluid pressure generating device and said wheel braking force generating device;

a high pressure source for supplying brake fluid pressure to said wheel braking force generating device independently from said brake fluid pressure generating device;

a second hydraulic path for transmitting brake fluid pressure of said high pressure source into said first hydraulic path;

a pressure difference generating device disposed in said first hydraulic path on a side of said brake fluid pressure generating device from a point to which said second hydraulic path is connected, which generates a pressure difference between brake fluid pressure on a side of said brake fluid pressure generating device and brake fluid pressure on a side of said wheel braking force generating device when said high pressure source supplies brake fluid pressure to said wheel braking force generating device; and determining means for determining an operating state of said pressure difference generating device with use of said pressure difference, wherein said brake fluid pressure generating device is a master cylinder which generates a master cylinder pressure in response to a brake pedal operation of a driver;

said determining means is provided with a master cylinder pressure sensor which detects brake fluid pressure on a master cylinder side of said control valve, and said determining means determines the operating state of said pressure difference generating device when output change of said master cylinder pressure sensor per unit time is within a predetermined range.

26. A brake control apparatus for a vehicle comprising:

a brake fluid pressure generating device which generates brake fluid pressure;

a wheel braking force generating device which causes braking force to be generated at a wheel by using brake fluid pressure generated by said brake fluid pressure generating device;

a first hydraulic path connecting said brake fluid pressure generating device and said wheel braking force generating device;

a high pressure source for supplying brake fluid pressure to said wheel braking force generating device independently from said brake fluid pressure generating device;

a second hydraulic path for transmitting brake fluid pressure of said high pressure source into said first hydraulic path;

a pressure difference generating device disposed in said first hydraulic path on a side of said brake fluid pressure generating device from a point to which said second hydraulic path is connected, which generates a pressure difference between brake fluid pressure on a side of said brake fluid pressure generating device and brake fluid pressure on a side of said wheel braking force generating device when said high pressure source supplies brake fluid pressure to said wheel braking force generating device; and determining means for determining an operating state of said pressure difference generating device with use of said pressure difference, wherein said high pressure source comprises a pump which draws in brake fluid from a master reservoir exclusively provided with a master cylinder, pressurizes and discharges brake fluid, an accumulator which accumulates brake fluid of high pressure discharged from said pump, and a control valve which holds high pressure brake fluid accumulated in said accumulator, and wherein said pressure difference generating device has a control valve for holding pressure difference between brake fluid pressure on a side of said brake fluid pressure generating device and brake fluid pressure on a side of said wheel braking force generating device when said high pressure source supplies brake fluid pressure to said wheel braking force generating device, and further comprising power brake control means for assisting to promptly generate braking force in said vehicle during a panicky braking operation of a driver, wherein said determining means determines the operation state of at least one of said control valve and said pump which are driven by said power brake control means.

* * * * *